United States Patent
Frey

(10) Patent No.: US 10,807,574 B2
(45) Date of Patent: *Oct. 20, 2020

(54) ELECTRICAL HARNESS

(71) Applicant: SAFRAN LANDING SYSTEMS, Velizy-Villacoublay (FR)

(72) Inventor: Olivier Frey, Velizy-Villacoublay (FR)

(73) Assignee: SAFRAN LANDING SYSTEMS, Vélizy-Villacoublay (FR)

( * ) Notice: Subject to any disclaimer, the term of this patent is extended or adjusted under 35 U.S.C. 154(b) by 0 days.

This patent is subject to a terminal disclaimer.

(21) Appl. No.: 16/221,338

(22) Filed: Dec. 14, 2018

(65) Prior Publication Data

US 2019/0184951 A1 Jun. 20, 2019

(30) Foreign Application Priority Data

Dec. 14, 2017 (FR) ..................................... 17 62155

(51) Int. Cl.
*B64C 25/44* (2006.01)
*B60T 8/17* (2006.01)
(Continued)

(52) U.S. Cl.
CPC ........ *B60T 8/1703* (2013.01); *B60R 16/0207* (2013.01); *B60R 16/0215* (2013.01); *B64C 13/24* (2013.01); *B64C 25/44* (2013.01); *G05B 19/042* (2013.01); *H04L 12/42* (2013.01); *F16D 2121/24* (2013.01)

(58) Field of Classification Search
CPC ................................ H01R 43/20; B64C 25/44

USPC ............ 361/807; 439/272–290, 655; 701/36; 385/88; 303/3, 15, 20; 174/72 A
See application file for complete search history.

(56) References Cited

U.S. PATENT DOCUMENTS

| | | | |
|---|---|---|---|
| 5,990,573 A | 11/1999 | Granitz et al. | |
| 9,611,035 B2 * | 4/2017 | Iordanidis | B60T 8/1703 |

(Continued)

FOREIGN PATENT DOCUMENTS

| | | |
|---|---|---|
| EP | 2 282 228 A1 | 2/2011 |
| EP | 2 719 592 A1 | 4/2014 |
| WO | 00/70723 A1 | 11/2000 |

OTHER PUBLICATIONS

Search Report dated Oct. 9, 2018, issued in corresponding French Application No. FR 1762155, filed Dec. 14, 2017, 2 pages.

*Primary Examiner* — Christopher P Schwartz
(74) *Attorney, Agent, or Firm* — Christensen O'Connor Johnson Kindness PLLC

(57) ABSTRACT

An electrical harness including at least one upstream connector arranged to be electrically connected to a computer, at least one downstream connector arranged to be connected to a complementary connector of an electromechanical actuator, and at least one electric wire electrically connecting the upstream connector and the downstream connector, the electric wire configured such that primary digital control signals produced or transferred by the computer travel over the electric wire via the upstream connector. The electrical harness may also include an electronic unit integrated in the electrical harness, the electronic unit configured to transform the primary digital control signals into analog control signals and to transmit the analog control signals to the electromechanical actuator via the downstream connector.

7 Claims, 3 Drawing Sheets

(51) Int. Cl.
    *G05B 19/042*     (2006.01)
    *H04L 12/42*     (2006.01)
    *B60R 16/02*     (2006.01)
    *B64C 13/24*     (2006.01)
    *F16D 121/24*     (2012.01)

(56) References Cited

U.S. PATENT DOCUMENTS

| | | | |
|---|---|---|---|
| 2007/0206906 A1* | 9/2007 | Stark | G02B 6/4201 |
| | | | 385/89 |
| 2012/0330597 A1 | 12/2012 | Lammers | |
| 2013/0338846 A1 | 12/2013 | Meret et al. | |
| 2017/0152022 A1 | 6/2017 | Moutaux et al. | |
| 2017/0152027 A1 | 6/2017 | Onfroy et al. | |

* cited by examiner

ELECTRICAL HARNESS

BACKGROUND

An electrical braking system for an aircraft generally comprises a plurality of brakes, each serving to brake a wheel of an undercarriage of the aircraft. Each brake comprises an actuator carrier having electromechanical actuators mounted thereon, each actuator comprising an electric motor, which is typically a three-phase electric motor.

In conventional centralized architectures for electric braking systems, the electromechanical actuators are grouped together in a plurality of groups. The electromechanical actuators in a given group are connected to the same computer situated in the fuselage of the aircraft.

The electric motor of each electromechanical actuator receives three-phase electrical power coming from the computer to which the electromechanical actuator is connected, and each electromechanical actuator transmits measurements of a servo-control parameter to the computer, e.g. measurements of the angular position of the rotor of the electric motor. The computers implement monitoring and control functions for the electromechanical actuators, and also power-generation functions that make use of inverters.

It is found that such a centralized architecture requires the use of a very large number of electric wires. The weight of the electric cables in an electrical braking system is thus significant.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with one or more aspects of the present disclosure, there is provided an electrical harness including at least one upstream connector configured to be electrically connected to a computer, at least one downstream connector configured to be connected to a complementary connector of an electromechanical actuator, and at least one electric wire electrically connecting the upstream connector and the downstream connector, the electric wire being arranged so that primary digital control signals produced or transferred by the computer travel over the electric wire via the upstream connector, the electrical harness also including an electronic unit integrated in the electrical harness, the electronic unit configured to transform the primary digital control signals into analog control signals and to transmit the analog control signals to the electromechanical actuator via the downstream connector.

The control signals of the electromechanical actuators (e.g., the primary digital control signals) can be transmitted over the long length of an electrical harness while in digital form, thus making it possible to reduce the weight of the electric cables included in the electrical harness.

Since the electronic unit is not integrated in the electromechanical actuator, any mechanical failure of the electromechanical actuator does not make it necessary to replace the electronic unit. Likewise, a failure of the electronic unit does not make it necessary to replace the electromechanical actuator. This serves to simplify design and to reduce maintenance costs for electromechanical actuators.

Furthermore, if redundancy and/or dissimilarity are necessary for the electronic unit, this can be implemented in the electrical harness instead of in the electromechanical actuator. There is therefore no need to have two different kinds of electromechanical actuator in one aircraft, nor is there any need to integrate two electronic units within a single electromechanical actuator.

There is also provided an electrical harness as described above, wherein the electronic unit is integrated in the downstream connector.

There is also provided an electrical harness as described above, wherein the electronic unit is integrated in part in the downstream connector and in part in the upstream connector.

There is also provided an electrical harness as described above, including two downstream connectors and two electronic units, each associated with a different one of the two downstream connectors, and thus with a different electromechanical actuator, the two electronic units differing from each other by at least one electrical component.

There is also provided an electrical harness as described above, wherein the electronic unit includes a processor or processing unit, an analog-to-digital converter, and a digital-to-analog converter, the analog-to-digital converter being arranged to convert analog measurement signals coming from the electromechanical actuator so as to obtain digital measurement signals, the processor or processing unit being arranged to implement a servo-control loop making use of the digital measurement signals to transform the primary digital control signals into digital motor control signals, and the digital-to-analog converter being arranged to convert the digital motor control signals so as to obtain the analog control signals.

There is also provided a system comprising a computer, an electromechanical actuator, and an electrical harness as described above.

There is also provided a system as described above, the system being an aircraft electrical braking system.

Other characteristics and advantages of the present disclosure appear on reading the following description of a particular, non-limiting embodiment of the present disclosure.

DESCRIPTION OF THE DRAWINGS

The foregoing aspects and many of the attendant advantages of the present disclosure will become more readily appreciated as the same become better understood by reference to the following detailed description, when taken in conjunction with the accompanying drawings, wherein.

DETAILED DESCRIPTION

The detailed description set forth below in connection with the appended drawings, where like numerals reference like elements, are intended as a description of various embodiments of the present disclosure and are not intended to represent the only embodiments. Each embodiment described in this disclosure is provided merely as an example or illustration and should not be construed as precluding other embodiments. The illustrative examples provided herein are not intended to be exhaustive or to limit the disclosure to the precise forms disclosed.

In the following description, specific details are set forth to provide a thorough understanding of exemplary embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

An object of the present disclosure is to reduce, for example, the weight of the electric cables of an electrical braking system, to simplify its design, and/or to reduce the cost of maintaining electromechanical actuators, while conserving only one kind of electromechanical actuator throughout the electrical braking system.

Figure 1:
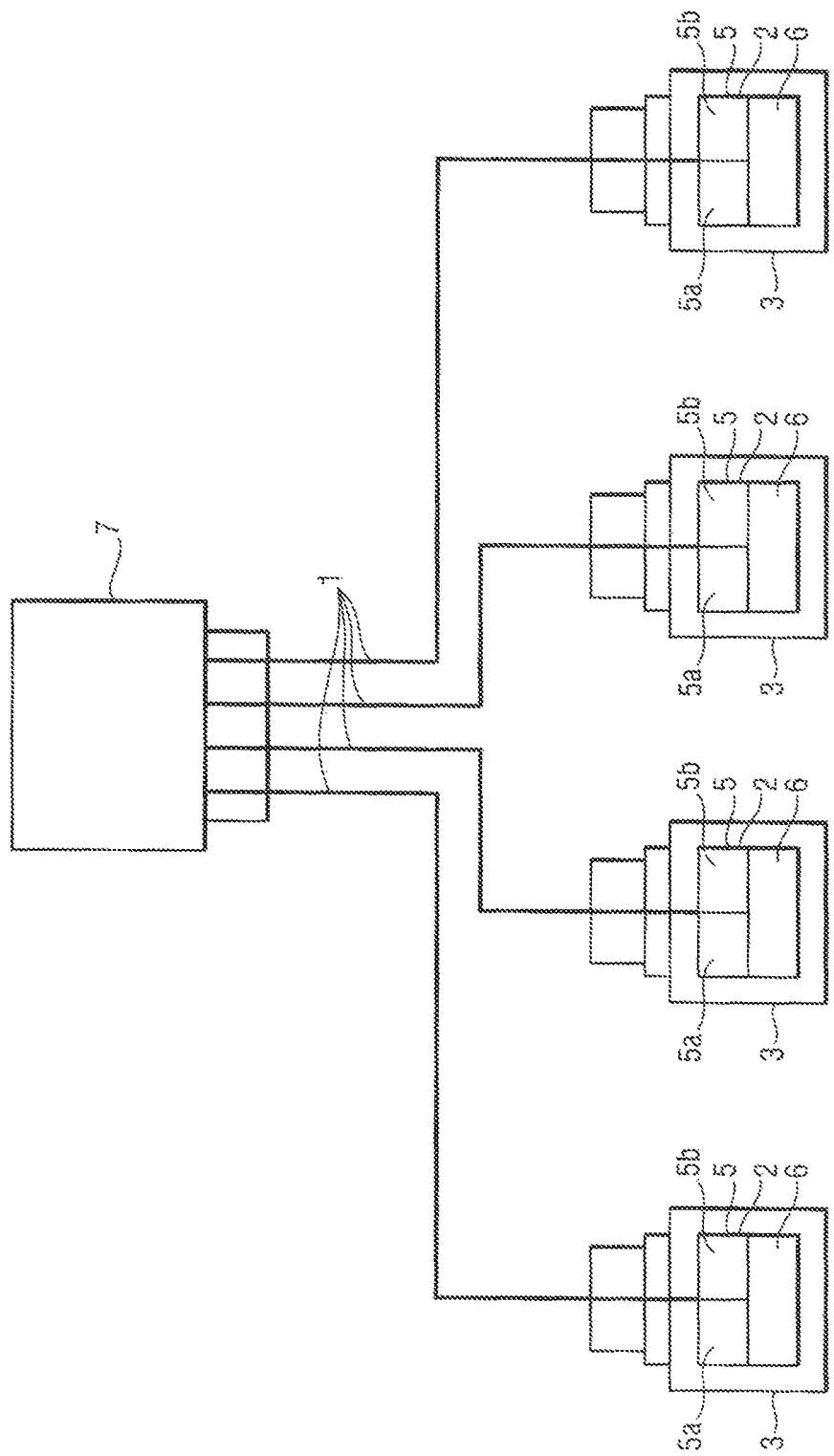
FIG. 1 shows a first conventional architecture for an electrical braking system.

A known electrical harness is shown in FIG. 1. In order to reduce the number of electric wires and thus the weight of electric cables 1, proposals have been made to integrate an electronic module 2 in each electromechanical actuator 3 in order to operate the electric motor of the electromechanical actuator 3.

The electronic module 2 includes a digital electronic unit 5 and an analog electronic unit 6. The digital electronic unit 5 receives digital brake-operation signals from the computer 7 and processes the digital brake-operation signals. By way of example, the digital brake-operation signals are digital signals for applying the brake, and by way of example, the processing consists in implementing servo-control loops for the motor in order to produce digital motor control signals. The digital electronic unit 5 then converts the digital motor control signals into analog motor control signals.

The analog electronic unit 6 transforms the analog motor control signals into three-phase alternating current (AC) power for the phases of the electric motor of the electromechanical actuator 3. Thus, the digital braking control signals are transmitted via a digital bus that runs along the undercarriage, thereby reducing the number of electric wires.

Requirements for operating safety, and also the requirement of having only one type of electromechanical actuator 3 throughout the electrical braking system, mean that it is necessary to fit each electromechanical actuator 3 with two digital electronic units 5a and 5b. It is possible for the two digital electronic units 5a and 5b to be dissimilar. This configuration increases the number of electronic components of the electronic module 2 within the electromechanical actuator 3, thereby leading to problems of integration in the available space.

Furthermore, a mechanical failure of any one of the electromechanical actuators 3 naturally requires the entire electromechanical actuator 3 to be removed and replaced, i.e. both the mechanical portion of the electromechanical actuator 3 and also the electronic module 2 that is integrated in the electromechanical actuator 3. However, since the electronic module 2 is complex and electronic components are expensive, replacing the electronic module 2 leads to major costs, even though the electronic module 2 remains operational.

Figure 2:
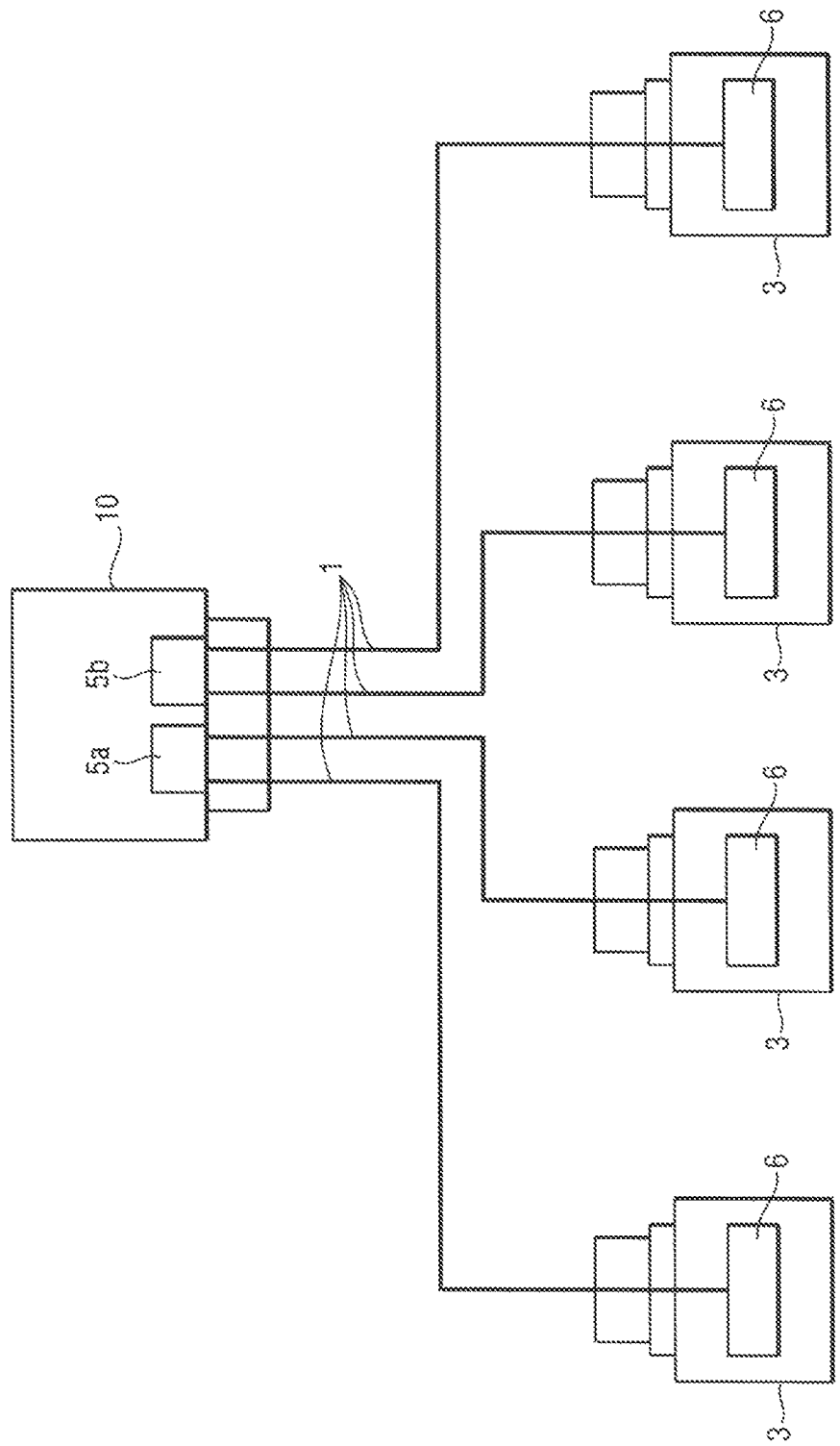
FIG. 2 shows a second conventional architecture for an electrical braking system.

Another known electrical harness is shown in FIG. 2. One solution that has been proposed for mitigating those drawbacks consists in locating the digital electronic units 5a and 5b remotely in a computer 10 that is located as close as possible to the electromechanical actuators 3, e.g. on the undercarriage. Nevertheless, conveying analog motor control signals makes it necessary once more to increase the number of electric wires, and thus to increase the weight of the electric cables 1 of the electrical braking system.

Figure 3:
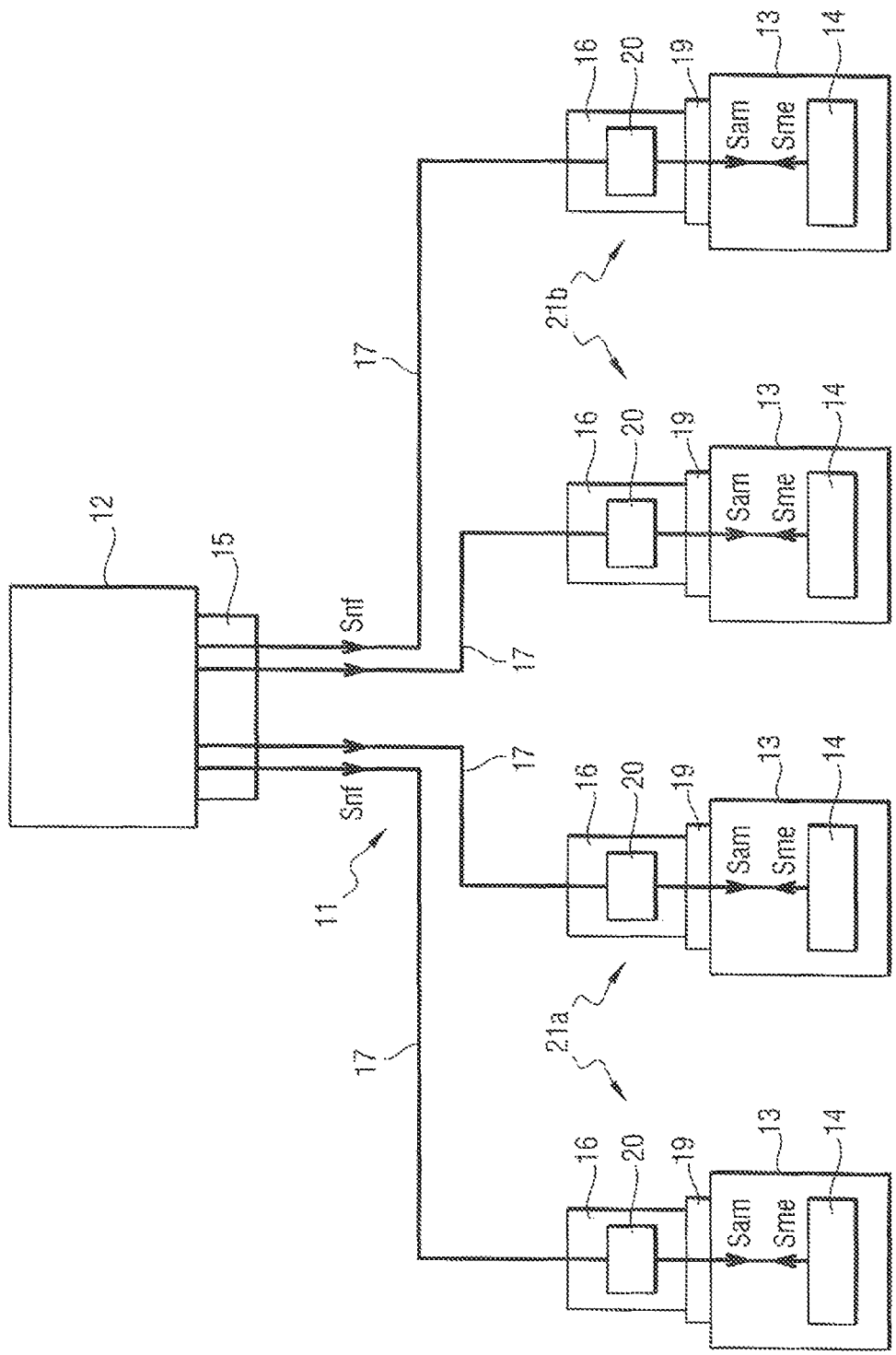
FIG. 3 shows one representative embodiment of an architecture for an electrical braking system making use of an electrical harness in accordance with embodiments of the present disclosure.

Turning now to FIG. 3, there is shown an electrical harness 11 used in an electrical braking system of an aircraft in accordance with one or more aspects of the present disclosure. In addition to the electrical harness 11, the electrical braking system comprises a computer 12, a power supply unit (not shown), and a brake for a wheel of a main undercarriage of the aircraft.

In some embodiments, the computer 12 is integrated in the avionics network of the aircraft, is located in a bay situated within the fuselage of the aircraft. The computer 12 acquires a braking order, e.g. generated by a pilot of the aircraft or by an automatic braking system, and it transforms the braking order into a braking setpoint. The computer 12 makes use of high-level braking control laws that include slow loops so as to convert the braking setpoint into primary digital control signals, specifically digital braking control signals Snf.

In the above example, the power supply unit is a power bus conveying electrical power coming from an electricity generator of the aircraft or from electricity storage means of the aircraft, such as a battery bank or the like, or indeed from a power converter unit connected to the power bus. Such a power converter unit is also referred to as a power supply unit (PSU).

The power supply unit generates electrical power, i.e., an electrical power supply in the form of a power supply voltage. The power supply voltage is a direct current (DC) voltage.

The brake comprises an actuator carrier having four electromechanical actuators 13 mounted thereon, together with friction members, specifically a stack of carbon disks. The four electromechanical actuators 13 are used to apply a braking force against the stack of carbon disks, thereby exerting braking torque on the wheel so as to slow down rotation of the wheel and thus brake the aircraft while it is on the ground.

Each electromechanical actuator 13 comprises a body that is fastened to the actuator carrier, and also a pusher. An analog power unit 14, an electric motor, and a mechanical module (not shown) are incorporated inside the body of the electromechanical actuator 13.

The analog power unit 14 comprises electrical components serving to convert DC power into AC power, specifically inverters, together with electrical filter components. The analog power unit 14 thus makes use both of the power supply voltage produced by the power supply unit and also of the analog motor control signals Sam to generate three-phase AC power delivered to the windings of a stator of the electric motor. The mechanical module transforms a rotary movement of an outlet shaft of the electric motor into a linear movement of the pusher.

The pusher is actuated by the electric motor via the mechanical module so as to slide and apply the braking force against the stack of carbon disks.

Each electromechanical actuator 13 also has a blocking member (not shown) serving to perform a parking brake function. The blocking member is arranged to hold the outlet shaft of the electric motor in a given position so as to block the pusher in position.

The electromechanical actuator 13 also has sensors that measure operating parameters of the electromechanical actuator in order to produce analog measurement signals Sme. The measurements taken comprise current measurements, voltage measurements, and angular position measurements for a rotor of the electric motor.

The computer 12 and the four electromechanical actuators 13 of the brake are connected together by the electrical harness 11. The term "electrical harness" is used herein to mean a bundle of electric cables and connectors. The term "electric cable" is used to mean an assembly comprising one or more electric wires (or electrical conductors) together with a sheath. The term "sheath" is used herein to mean any layer that separates the electric wire(s) of an electric cable from the outside, or indeed that separates a plurality of grouped-together electric cables from the outside. By way of example, the layers include shielding (such as a conductive braid), a dielectric, an insulating layer, a heat-shrink sheath, etc.

In some embodiments, the electrical harness 11 has an upstream connector 15, four downstream connectors 16, and four electric cables 17. The upstream connector 15 is electrically connected to the computer 12. In this example, the upstream connector 15 is connected directly to a complementary connector of the computer 12.

Each downstream connector 16 is electrically connected to an electromechanical actuator 13. Each downstream connector 16 is directly connected to a complementary connector 19 of an electromechanical actuator 13.

The four electric cables 17 have electric wires that electrically connect together the upstream connector 15 and the downstream connectors 16. In some embodiments, the four electric cables 17 are grouped together inside a common sheath over part of the length of the electrical harness 11. This part of the length corresponds to the path followed by the electrical harness 11 once integrated in the aircraft between the computer 12 and the brake of the wheel situated at the bottom of the main undercarriage. The four electric cables 17 are thus grouped together between the computer 12 and the brake, and the four electric cables 17 are separated from one another at the location where the electrical harness 11 is connected to the brake.

The electrical harness 11 also has four electronic units 20. Each electronic unit 20 comprises a circuit card with electrical components mounted thereon. Each electronic unit 20 in this example is integrated in a respective downstream connector 16. The circuit card of each electronic unit 20 is miniaturized. The miniaturization makes use of high density microelectronic methods and technologies, of the system on chip, multi-chip module, or 3D packaging type.

By means of this miniaturization, integrating the electronic unit 20 in the downstream connector 16 does not require any change to the size of said downstream connector 16. Each downstream connector 16 thus presents overall volume and size that are similar to those of the connectors that serve conventionally to connect an electric cable to an electromechanical braking actuator.

The circuit card of each electronic unit 20 includes a processing or processor component, a digital-to-analog converter, and an analog-to-digital converter. In this example, the processor component is a microcontroller, however it could be some other component, e.g. a processor, a field programmable gate array (FPGA), an application specific integrated circuit (ASIC), etc.

The analog-to-digital converter acquires the analog measurement signals Sme and converts them into digital measurement signals.

The processor component acquires the digital braking control signals Snf and the measurements of the angular position of the rotor of the electric motor (included in the digital measurement signals), and implements fast servo-control loops for operating the motor in order to produce the digital motor control signals.

The digital-to-analog converter converts the digital motor control signals into analog motor control signals Sam. The analog motor control signals Sam are then delivered to the analog power unit 14 of the electromechanical actuator 13, which uses the analog motor control signals Sam to generate the three-phase power that is applied to the windings of a stator of the electric motor.

In some embodiments, the electromechanical actuators 13 are grouped together as two distinct groups of electromechanical actuators 13. The electronic units 20 are thus likewise grouped together in two distinct groups 21a and 21b of electronic units 20. The two electronic units 20 in a given group 21 are dissimilar, i.e. they are of different designs. Specifically, the two electronic units 20 in a given group 21 differ from each other by at least one electrical component, specifically the processor component. Such dissimilarity serves to avoid a common mode failure of the processor component being capable of leading to total loss of braking of the wheel.

The use of an electrical harness 11 of the present disclosure thus makes it possible to benefit both from the advantages of a solution with a digital electronic unit located remotely in a nearby computer, and the advantage of a solution with a digital electronic unit integrated in the electromechanical actuator.

The electronic unit 20 of the electrical harness 11 is specifically close to the electromechanical actuator 3 and the digital connection is extended as far as the electromechanical actuator 3 without being directly integrated in the electromechanical actuator 3.

The electrical harness 11 makes it possible to add a digital interface, specifically the electronic unit 20, to a pre-existing electromechanical actuator 3 that is already integrated in an electrical braking system. The digital interface serves to control the electromechanical actuators 3 by using digital signals (digital braking control signals Snf and digital motor control signals) that travel via digital buses, which are simpler to implement.

The digital interface thus also makes it possible to digitize the analog measurement signals Sam so that they can be transmitted over a digital network connected to a network of the aircraft. An electrical braking system is thus obtained that is less analog and more digital by means of a solution that is relatively simple.

Digitizing the signals also makes it easier to share information between pieces of equipment (computers, electromechanical actuators, etc.), while minimizing the number of additional electric wires.

The use of the electrical harness 11 also makes it possible to carry out diagnostic operations on the electromechanical actuators and the sensors (whether integrated in or connected to the electromechanical actuators) that cannot be performed in prior art systems.

It should be appreciated that this solution is adapted to environments in which the space available for integration is constrained and limited, without room for integrating an additional electronic housing.

In this regard, embodiments of the present disclosure serve to reduce the number of electric wires in the electrical harness 11 connecting a computer 12 to the electromechanical actuators 3 (since the signals are conveyed primarily in digital form). The solution also provides flexibility for future changes, making it possible to add functions (and in particular to incorporate new exchanges of information) without it being necessary to add electric wires.

By means of the electrical harness 11, the electronic portion for performing conditioning, processing, and communication functions (e.g., the electronic unit 20) is independent of the electromechanical portion of the electromechanical actuator (i.e. the analog power unit 14, the mechanical module, and the electric motor). In the event of one of those portions failing, only the failed portion needs to be replaced.

The requirements for operating safety are satisfied as a result of it being possible to use distinct electronic units 20 within a single electrical harness 11. The requirement for using only one kind of electromechanical actuator 3 for all of the brakes of the aircraft is also satisfied.

The present disclosure is not limited to the particular embodiment described above, but on the contrary covers any variants coming within the ambit of the present disclosure as defined by the claims.

It is specified above that each electronic unit is integrated in a downstream connector. However the electronic units could be integrated in some other way in the electrical harness. For example, an electronic unit may be integrated in part in an upstream connector and in part in a downstream connector. An electronic unit may also include components situated inside a sheath of the electrical harness, between an upstream connector and a downstream connector. An electronic unit may also be contained in a possibly flexible housing that extends at least in part outside the electrical harness, around a sheath of the electrical harness.

It is stated above that the upstream connector of the electrical harness is connected directly to a complementary connector of the computer. The upstream connector could equally well be electrically connected to the computer, not directly, but for example via another electrical harness or another electric cable. The upstream connector need not necessarily be a genuine "connector", but could merely be a conductive connection element (such as an end of an electric wire in the electrical harness) enabling the electrical harness to be connected to the computer.

It is stated above that two electronic units in the same group are dissimilar and that their dissimilarity comes from different processor components. Dissimilarity, which is not mandatory, can also apply to one or more other components, and it may involve hardware dissimilarity and/or software dissimilarity.

The description refers to a computer that is connected via the electrical harness to four electromechanical actuators of a brake. A single power supply unit is also connected to the four electromechanical actuators. The present disclosure naturally applies to architectures that are different. The electromechanical actuators of a given brake need not necessarily be connected to the same computer or to the same power supply unit, a brake may have some other number of electromechanical actuators, a computer may be connected to electromechanical actuators of brakes for different wheels, or indeed for wheels of different undercarriages, etc.

The description states that the computer is positioned in a bay situated inside the fuselage of the aircraft. The computer could be positioned in some other location, e.g. on the undercarriage. The computer could be integrated in a junction box of the undercarriage, having the initial function of making connections between cables running along the undercarriage and equipment of the undercarriage.

Consequently, the structure of the electrical harness could be different from that described. The present disclosure naturally applies to an electrical harness having other numbers of connectors and cables.

The present disclosure may also be implemented in a braking system for a vehicle other than an aircraft. By way of example, the vehicle could be a car, a motorbike, a train, etc. The present disclosure may also be implemented in a system other than a braking system. The present disclosure applies to any system that has electromechanical actuators connected to any kind of computer. The "computer" could equally well have a role that is different from that described above.

The term "computer" is thus used herein to mean electrical equipment capable of producing digital control signals for the electromechanical actuator, or indeed any electrical equipment capable of transferring digital control signals for the electromechanical actuator. Thus, the computer could very well merely be a digital switch that transfers digital control signals that are generated upstream from the "computer". Accordingly, the computer can be implemented in hardware or software or a combination of hardware and software.

It should be understood that various components of the electrical braking system may include, in some embodiments, logic for implementing the technologies and methodologies described herein. This logic can be carried out in either hardware or software, or a combination of hardware and software. For example, in some embodiments, one or more of these components includes one or more computing devices such as a processor (e.g., a microprocessor), a central processing unit (CPU), a digital signal processor (DSP), an application-specific integrated circuit (ASIC), a field-programmable gate array (FPGA), or the like, or any combinations thereof, and can include discrete digital or analog circuit elements or electronics, or combinations thereof.

In an embodiment, one or more of these components includes a microprocessor and a memory storing logic modules and/or instructions for carrying out the function(s) of these components, either separately or in any combination. In an embodiment, one or more of these components includes one or more ASICs having a plurality of predefined logic components. In an embodiment one or more of these components includes one or more FPGA having a plurality of programmable logic components. In an embodiment, one or more of these components includes hardware circuit implementations (e.g., implementations in analog circuitry, implementations in digital circuitry, and the like, and combinations thereof). In an embodiment, one or more of these components includes combinations of circuits and computer program products having software or firmware instructions stored on one or more computer readable memories that work together to cause a device to perform one or more methodologies or technologies described herein.

The present application may include references to directions, such as "forward," "rearward," "front," "rear," "upward," "downward," "top," "bottom," "right hand," "left hand," "lateral," "medial," "in," "out," "extended," etc. These references, and other similar references in the present application, are only to assist in helping describe and to understand the particular embodiment and are not intended to limit the present disclosure to these directions or locations.

The present application may also reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. The terms "about," "approximately," "near," etc., mean plus or minus 5% of the stated value. For the purposes of the present disclosure, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

The embodiments of the invention in which an exclusive property or privilege is claimed are defined as follows:

1. An electrical harness, comprising:
    an upstream connector configured to be electrically connected to a computer;
    a downstream connector configured to be connected to a complementary connector of an electromechanical actuator;
    an electric wire electrically connecting the upstream connector and the downstream connector, the electric wire configured such that primary digital control signals produced or transferred by the computer travel over the electric wire via the upstream connector; and
    an electronic unit integrated in the electrical harness, the electronic unit configured to transform the primary digital control signals into analog control signals and configured to transmit the analog control signals to the electromechanical actuator via the downstream connector.

2. The electrical harness of claim 1, wherein the electronic unit is integrated in the downstream connector.

3. The electrical harness of claim 1, wherein the electronic unit includes at least one component that is integrated in the downstream connector.

4. The electrical harness of claim 1, comprising two downstream connectors and two electronic units, each electronic unit associated with a different one of the two downstream connectors, and thus with a different electromechanical actuator, wherein the two electronic units differ from each other by at least one electrical component.

5. The electrical harness of 1, wherein the electronic unit comprises a processor unit, an analog-to-digital converter, and a digital-to-analog converter, wherein the analog-to-digital converter is arranged to convert analog measurement signals coming from the electromechanical actuator to obtain digital measurement signals, wherein the processor unit is arranged to implement a servo-control loop making use of the digital measurement signals to transform the primary digital control signals into digital motor control signals, and wherein the digital-to-analog converter is arranged to convert the digital motor control signals to obtain the analog control signals.

6. A system, comprising:
    a computer;
    an electromechanical actuator; and
    an electrical harness according to claim 1.

7. The system of claim 6, wherein the system is an aircraft electrical braking system.

* * * * *